(12) United States Patent
Olson et al.

(10) Patent No.: US 8,807,325 B2
(45) Date of Patent: Aug. 19, 2014

(54) FORMING OF METAL CONTAINER BODIES

(75) Inventors: Christopher J. Olson, Superior, CO (US); Harold Cook, Jr., Evergreen, CO (US); Michael Atkinson, Lafayette, CO (US); Randy Worwag, Arvada, CO (US); Peter Kubisa, Littleton, CO (US); Chris Reynolds, Parker, CO (US); Larry Patchen, Brighton, CO (US)

(73) Assignee: Crown Packaging Technology, Inc., Alsip, IL (US)

( * ) Notice: Subject to any disclaimer, the term of this patent is extended or adjusted under 35 U.S.C. 154(b) by 35 days.

(21) Appl. No.: 13/329,617

(22) Filed: Dec. 19, 2011

(65) Prior Publication Data
US 2012/0326372 A1 Dec. 27, 2012

Related U.S. Application Data

(62) Division of application No. 11/980,283, filed on Oct. 29, 2007, now Pat. No. 8,096,156.

(60) Provisional application No. 60/876,654, filed on Dec. 22, 2006.

(51) Int. Cl.
*B65G 17/46* (2006.01)

(52) U.S. Cl.
USPC ............... 198/473.1; 198/471.1; 198/428; 198/438; 198/689.1

(58) Field of Classification Search
None
See application file for complete search history.

(56) References Cited

U.S. PATENT DOCUMENTS

| | | | |
|---|---|---|---|
| 4,058,864 A | 11/1977 | Morland | |
| 4,143,776 A | 3/1979 | Meyers et al. | |
| 4,175,417 A | 11/1979 | Vergnani et al. | |
| 4,523,360 A | 6/1985 | Govanola | |
| 4,547,645 A | 10/1985 | Smith et al. | |
| 4,549,419 A | 10/1985 | Trost et al. | |
| 4,614,018 A | 9/1986 | Krall | |
| 4,830,169 A * | 5/1989 | Nariki et al. | 198/345.1 |
| 5,355,710 A | 10/1994 | Diekhoff | |
| 5,768,931 A | 6/1998 | Gombas | |
| 5,775,161 A | 7/1998 | Caleffi et al. | |

(Continued)

FOREIGN PATENT DOCUMENTS

| EP | 0118186 | 9/1984 |
|---|---|---|
| EP | 0275369 | 5/1992 |

(Continued)

OTHER PUBLICATIONS

International Patent Application No. PCT/CA2007/001941: International Search Report dated Oct. 31, 2007, 6 pages.

*Primary Examiner* — Kavel Singh
(74) *Attorney, Agent, or Firm* — Baker & Hostetler LLP

(57) ABSTRACT

Apparatus and method for forming (e.g. die necking) open ends of open-ended metal container bodies. An exemplary embodiment provides a number of movable holders for container bodies that move the container bodies along a path extending through the apparatus. A motor advances the holders and container bodies along the path in steps with pauses between each step. Each step advances one or more container bodies (and preferably two or more). One or more groups of work stations positioned adjacent to the path provides tool sets for carrying out a forming operation on one (and preferably two or more) container bodies simultaneously. Individual container bodies, or more preferably groups of two or more, are subjected to one or more forming operations during passage along the path (preferably the periphery of one or more star wheels).

8 Claims, 9 Drawing Sheets

(56) References Cited

U.S. PATENT DOCUMENTS

| | | |
|---|---|---|
| 5,943,928 A | 8/1999 | Oh |
| 6,200,245 B1 | 3/2001 | Dodo et al. |
| 6,240,796 B1 | 6/2001 | Yamada |
| 7,073,365 B2 | 7/2006 | Geho et al. |
| 8,006,826 B2 * | 8/2011 | Licht .................. 198/471.1 |
| 2002/0066327 A1 | 6/2002 | Nagai et al. |
| 2004/0069736 A1 * | 4/2004 | Peronek et al. ............... 215/42 |
| 2006/0101889 A1 | 5/2006 | Schill et al. |
| 2006/0104745 A1 | 5/2006 | Schill et al. |
| 2008/0034823 A1 | 2/2008 | Frattini et al. |
| 2008/0168815 A1 | 7/2008 | Coates |

FOREIGN PATENT DOCUMENTS

| | | |
|---|---|---|
| EP | 1214991 | 2/2005 |
| JP | H02-220723 | 3/1990 |
| JP | H05-305374 | 11/1993 |
| JP | 2000-503260 | 3/2000 |
| JP | 2000-312992 | 11/2000 |
| WO | WO 99/65646 | 12/1999 |

* cited by examiner

FORMING OF METAL CONTAINER BODIES

CROSS REFERENCE TO RELATED APPLICATIONS

This application is a divisional application of pending U.S. patent application Ser. No. 11/980,283, filed on Oct. 29, 2007, which claims priority to U.S. Provisional Application Ser. No. 60/876,654, filed Dec. 22, 2006. Each of the foregoing applications is incorporated by reference herein in its entirety.

BACKGROUND OF THE INVENTION

1. Field of the Invention

The present invention relates to methods of and apparatus for producing containers. More particularly, the invention relates to forming operations carried out on open-ended container bodies during the manufacture of containers, for example die necking, shaping (expansion), flanging, and similar forming operations.

2. Background Art

In the following discussion, reference is made to die-necking as an example of the type of forming operations that may be carried out, but it should be kept in mind that the present invention is not limited solely to die-necking operations.

The technology for modifying an open-ended portion of a closed end container has been in existence for over one hundred years. The procedure was originally developed for artillery shells, with a larger diameter shell casing being reduced at the open end to retain a smaller diameter projectile. The process by which this is accomplished today is called die-necking. The basic concept of necking is to take a typically cylindrical, thin walled metal container body or shell having a given diameter and physically push the open end into a die or series of progressively smaller dies. In the course of this process, a reduction in diameter of the open end is realized.

Nowadays, in the case of metal containers intended for food and beverages, a primary purpose for reducing the diameter at the open-end is material savings, and thus cost savings. Containers of this kind are normally produced by manufacturing an open-ended container body, and then closing the container body with an end panel. Because the end panel is normally of a thickness that is greater than the thickness of a typical sidewall, as the diameter of the container body is reduced at the open end, the amount of material required for the end panel is reduced by a greater amount. Alternatively, in certain other applications, such as aerosol containers, the necking operation is performed to bring the opening to a specific diameter to accommodate a standard size valve assembly and to eliminate any secondary adaptor that would otherwise be necessary to accommodate differences of size. A second consideration in such operations is the reduction in the longitudinal stress exerted on the end of the container when the container is filled with a substance under pressure. As the end wall size is reduced, the total force it encounters at a given pressure is reduced and the end wall can thus be reduced further in thickness. A third consideration for diameter reduction is visual. Many aesthetically pleasing container shapes can be achieved by necking conventional cylindrical shapes into tapered geometries and containers that resemble bottles.

There are practical limits to the reduction of the diameter of the open end of a container body for any given material achievable by any given die. The strength of the container body depends on a number of factors including the Young's modulus and yield stress of the material, the plate thickness and the container diameter. If the practical limit on diameter reduction is exceeded, the material will wrinkle, pleat, pucker or tear at a point inherent to the geometrical characteristics and type of metal being necked.

Conventional die necking of metal containers is accomplished with large-scale machinery, and it is very difficult to fine-tune the parameters necessary to manufacture containers with significant container neck length. The development of necking profiles is currently a long and involved process of trial and error that can require months to establish the proper parameters for each necking stage necessary to produce long-neck containers. Specifically, current die necker technology uses hard cams to provide motion to pushers and knock-out rams. Key parameters such as the cam profile and cam throw must be tested and tweaked with each incremental change in the necking profile. Each time a change is made, the machine must be taken down and modified in a lengthy process to redesign and refit the new cams.

U.S. Pat. No. 5,355,710 discloses a conventional method and apparatus for necking a metal container. The disclosure of this patent is specifically incorporated herein by reference.

U.S. Pat. No. 5,768,931 discloses an apparatus having a number of planetary turrets that rotate on their own axes through a series of indexed positions. Tools engage a workpiece held in a planetary turret at successive workstations.

In modern manufacturing methods, it is important to provide apparatus that may carry out forming operations in a manner that is easily changeable, and that may be carried out with high throughput so that productivity is improved. Conventional methods have tended to be difficult to modify for new operations, and may be slow and temperamental. There is, therefore, a need for improved forming apparatus and methods.

SUMMARY OF THE INVENTION

An exemplary embodiment of the present invention provides apparatus for forming open ends of open-ended metal container bodies, the apparatus comprising a plurality of movable holders separated by substantially equal spacings from each other, each holder being adapted to receive and temporarily retain an open-ended metal container body therein with an open-end of the container body exposed to allow forming thereof, the holders being adapted to move a plurality of the container bodies along a path in the apparatus; a drive motor adapted and controlled to advance the holders in steps of advancement with pauses therebetween, each step producing an advancement that is the same for each step and is equivalent to a multiple of two or more of the spacings between the holders; at least one group of two or more tool sets positioned adjacent to the path and separated from each other along the path by distances equivalent to the spacings between the holders, each tool set being adapted for forming an open end of a container body aligned therewith, and each group having a number of tool sets that is the same as the multiple of the spacings employed for the steps of advancement.

Another exemplary embodiment provides a method of shaping open ends of open-ended metal container bodies, comprising advancing a plurality of open-ended metal container bodies along a path in steps of advancement with pauses therebetween, each step producing a movement of container bodies along the path corresponding to an advancement of two or more container bodies; engaging a plurality of tool sets acting as a group during the pauses with open ends of adjacent container bodies, thereby forming the open ends of the container bodies, the plurality of tool sets engaged as the group being equal in number to the container bodies advanced along the path during each step; and removing container bodies at an end of the path. Preferably, all of the tool sets of the group are chosen and operated to carry out identical forming operations on the container bodies.

Another exemplary embodiment provides apparatus for forming open ends of open-ended metal container bodies, the apparatus comprising a first plurality of movable holders each adapted to receive and temporarily retain an open-ended metal container body therein with an open-end of the container body exposed to allow forming thereof, the first plurality of holders being constrained to move in a first endless circuit; a second plurality of the movable holders being constrained to move in a second endless circuit aligned with the first endless circuit; transfer devices for transferring containers from holders of the first plurality to holders of the second plurality, and back again from holders of the second plurality to holders of the first plurality, such that containers first introduced into the holders of the first plurality follow a path through the apparatus that includes parts of both the first and second circuits; at least one drive motor adapted for advancing the container bodies retained within the holders along the path in steps of advancement with pauses therebetween, each step producing a movement of container bodies along the path corresponding to an advancement of one or more container bodies; at least one tool set positioned adjacent to the path adapted for forming an open end of a container body aligned therewith; a feed device adapted to feed open-ended container bodies individually to the holders of the first plurality at a start of the path; and a removal device for removing container bodies from the movable holders of the first plurality at an end of the path.

A further exemplary embodiment provides apparatus for forming open ends of open-ended metal container bodies, the apparatus comprising a plurality of movable holders, each holder being adapted to receive and temporarily retain an open-ended metal container body therein with an open-end of the container body exposed to allow forming thereof, the holders being constrained to move a plurality of the container bodies along a path extending through the apparatus; a drive motor adapted for advancing the container bodies retained within the holders along the path in steps of advancement with pauses therebetween, each step producing a movement of container bodies along the path corresponding to an advancement of one or more container bodies; at least one group of work stations positioned adjacent to the path, each work station of the at least one group having a tool set for forming an open end of a container body aligned therewith; an actuator for engaging the tool sets of the at least one group of work stations with an aligned container body during pauses between the steps of advancement; a feed device adapted to feed open-ended container bodies individually to the plurality of movable holders at a start of the path; and a removal device for removing container bodies from the plurality of movable holders at an end of the path; wherein the tool sets of the at least one group of work stations are constrained to move in unison, thereby all carrying out forming operations on a plurality of container bodies aligned therewith both simultaneously and in an identical manner.

Yet a further exemplary embodiment provides a star wheel for use with apparatus for forming open ends of open-ended metal container bodies, the star wheel comprising a hub adapted for rotation about a central axis; a rim spaced from the hub; means, such as spokes, interconnecting the hub and the rim; a plurality of holders for container bodies spaced evenly around the rim; and means for holding the container bodies temporarily in the holders at the rim; wherein the holders are detachable from the star wheel and replaceable by other holders. The holders are preferably depressions formed in a peripheral ring attached to the rim, and the ring is detachable from the rim and replaceable by a different ring having the other holders formed therein.

A still further exemplary embodiment provides apparatus for forming open ends of open-ended metal container bodies, the apparatus comprising: a plurality of movable holders for container bodies constrained to move the bodies in a path in the apparatus; a first apparatus unit on one side of the path; and a second apparatus unit on an opposite side of the path, wherein the first and second units confront each other across the path and carry tool sets that cooperate to achieve forming of container bodies held between the units by the holders in the path; wherein at least one of the first and second apparatus units is adapted for movement to vary distance between the units.

A still further exemplary embodiment provides apparatus for forming open ends of open-ended metal container bodies, the apparatus comprising a plurality of movable holders separated by substantially equal spacings from each other, each holder being adapted to receive and temporarily retain an open-ended metal container body therein with an open-end of the container body exposed to allow forming thereof, the holders being adapted to move a plurality of the container bodies along a non-circular path in the apparatus; a drive motor adapted and controlled to advance the holders in steps of advancement with pauses therebetween, each step producing an advancement that is the same for each step and is equivalent to one or more of the spacings between the holders; two or more tool sets positioned adjacent to the path and separated from each other along the path by distances equivalent to at least one of the spacings between the holders, each tool set being adapted for shaping an open end of a container body aligned therewith. The tool sets preferably comprise tubular necker dies, knockout shafts movable within the necker dies, and pusher rods for pushing container bodies into the necker dies.

A group of tool sets provided at consecutive workstations contains at least two tool sets, and preferably considerably more, e.g. 4, 6 or 8. By providing the tool sets in groups, two or more container bodies may be worked on simultaneously, and thus the throughput of the apparatus can be increased compared to apparatus carrying out a single operation on can bodies one at a time.

BRIEF DESCRIPTION OF THE DRAWINGS

FIG. 13 is a perspective view of an apparatus based on that of FIGS. 1 and 2, but showing equipment that makes part of the apparatus movable for improved access during maintenance and the like.

DETAILED DESCRIPTION OF THE INVENTION

Figure 1:
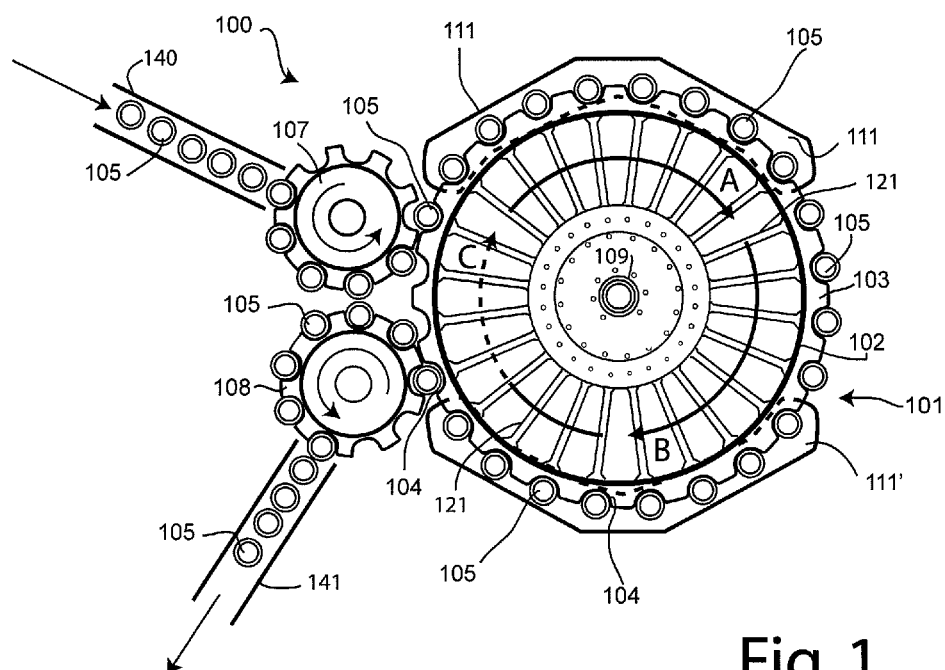
FIG. 1 is a simplified side view of a part of an apparatus according to one exemplary embodiment with certain equipment removed for clarity.

FIG. 1 of the accompanying drawings shows an exemplary embodiment 100 in partial view and simplified schematic form. In particular, supporting framework has been omitted for clarity. The drawing shows a vertical elevation of a die necker apparatus viewed along the line I-I of the top plan view of FIG. 2. This part of the apparatus is sometimes referred to as a turret, and includes a star wheel 101 having a central hub 109, a series of spokes 121, and a rim 102 supporting a peripheral ring 103 shaped to form a series of twenty four container body holders 104 spaced evenly around the periphery of the wheel 101. Each of the holders 104 is a semi-cynlindrical depression in the outer surface of the peripheral ring 103 dimensioned to snugly receive an open-ended cylindrical container body 105 (e.g. an aluminum or steel beverage can body) when oriented with its axis parallel to the rotational axis of the star wheel about the hub 109. The container bodies are individually fed to the star wheel 101 by a feeder (infeed) transfer wheel 107 as the star wheel rotates in a clockwise direction (as shown by arrows A, B and C). Container bodies 105 are ultimately removed from the star wheel by removal (discharge) transfer wheel 108. The container bodies 105 are held in place in the holders 104 during the rotation of the star wheel 101, and in similar holders in the feeder and removal transfer wheels 107 and 108, by means of suction applied through holes provided in inner surfaces of the holders 104 (as will be explained more fully later). As an alternative to the use of suction for holding the container bodies, magnets may be incorporated into the holders 104 when the apparatus is intended for use with container bodies made of steel or other ferrous metals.

The star wheel 101 is rotated by a drive motor (not shown in FIGS. 1 and 2) in a stepwise or indexed manner such that the wheel is repeatedly advanced by equal amounts between short pauses of non-rotation. In the illustrated embodiment, the star wheel is rotated during each period of advancement by a distance corresponding to the advancement of eight holders 104 or container bodies 105, i.e. by one third of a turn or 120° (although, in other embodiments, the rotation could be more or less). Accordingly, container bodies 105 are advanced in groups of eight during each rotational step such that, as the star wheel is first loaded from feeder transfer wheel 107 (which acts as a container body feed device), a first group of eight container bodies 105 is introduced into the holders 104 at the top part of the star wheel in the first rotational step (as shown by arrow A), then, after a short pause, these eight container bodies move with the holders to the four holder positions on the right side of the star wheel and four holder positions at the bottom part of the wheel (arrow B). As the wheel makes another one third rotation in the third step, the leading four container bodies of this first group are removed by the removal transfer wheel 108 (acting as a container body removal device), and the trailing four container bodies of the first group are moved to occupy holder positions at the lower part of the star wheel 101 immediately adjacent to the transfer wheel 108 (arrow C, the dashed part of which corresponds to the removal of container bodies from the star wheel). At this point, the star wheel is fully loaded with container bodies around its periphery. As groups of eight new container bodies 105 are introduced into the holders 104 by feeder transfer wheel 107 at each stepwise turn, eight container bodies are removed from the star wheel by removal transfer wheel 108. Additional container bodies are supplied to feeder transfer wheel 107 via a chute 140 and processed container bodies are removed from removal transfer wheel 108 via chute 141. It will be noticed that most or all of the four holder positions at the left side of the star wheel 101 are not occupied by container bodies because they are positioned between the feeder transfer wheel 107 and the removal transfer wheel 108.

The movement of the container bodies through the apparatus from the feeder transfer wheel 107 to the removal transfer wheel 108 is referred to as the path followed by the container bodies in the apparatus. In this embodiment, the path is part-circular and includes the periphery of the star wheel between the feeder and removal transfer wheels. The holders 104 are themselves confined to follow a circuit (in this case circular) completely around the periphery of the star wheel as the star wheel rotates.

A group of eight work stations are provided at the top of the wheel and another group of eight workstations are provided at the bottom of the wheel. These work stations are merely fixed locations spaced around the wheel that come into register with particular container holders as the wheel pauses between each rotational step, and they are locations where tool sets for forming the container body are positioned. The tool sets consist of pusher rods 110 on one side of the wheel and combinations of tubular necker dies 115 and knockout shafts 116 on the other side of the wheel (see FIG. 2). The pusher rods 110 at all of the eight workstations at the top of the wheel are rigidly connected to a movable pusher rod frame element 111 having a shallow inverted approximately "V" shape. Similarly, eight pusher rods 110 at the workstations at the bottom of the wheel are each rigidly connected to a second movable pusher rod frame element 111' (also of shallow inverted approximately "V" shape). The pusher rod frame elements 111 and 111' are moved in the directions of double-headed arrow D towards and away from the star wheel during each rotational pause of the star wheel by a drive means described in more detail later. Since the two groups of pusher rods 110 are rigidly attached to their respective pusher rod frame elements, they move in unison with those elements and with the other rods of the group. On the other side of the wheel, there are eight tubular necker dies 115 at the workstations at the top of the wheel, and eight tubular necker dies 115 at the workstations at the bottom of the wheel. These necker dies do no move at all as they are rigidly attached to a stationary frame element 117 forming part of the apparatus frame (not shown). Each necker die 115 is provided with a knockout shaft 116 that projects into the tubular necker die from the rear (the part most distant from the star wheel). The outermost ends of the eight knockout shafts 116 occupying the workstations at the top of the wheel are rigidly connected to a movable knockout shaft frame element 118, and similarly, the eight knockout shafts 116 occupying the workstations at the bottom of the wheel are each connected to a second knockout shaft frame element (not visible in FIGS. 1 and 2, but positioned facing frame 111' on the opposite side of the star wheel). These movable frame elements are moved by drive means (described in more detail later) towards and away from the star wheel in the directions shown by double headed arrow E during each rotational pause of the star wheel. Since the knockout shafts 116 are all rigidly attached either to knockout shaft frame element 118 at the top of the wheel or to the equivalent element at the bottom of the wheel, they move in unison with their respective frame elements and with the other knockout shafts of their respective group.

Between the stepwise rotations of the star wheel 101, i.e. for the short pauses in rotation when the star wheel is stationary, the tool sets at all the workstations around the wheel are operated to carry out a shaping (die necking) operation on the container bodies brought into alignment with the tool sets by the star wheel. Each die necking operation may be equivalent to those disclosed in U.S. Pat. No. 7,073,365 which issued on Jul. 11, 2006 to Geho et al. (the disclosure of which is incorporated herein by reference). This patent describes a linear drive metal forming machine operated under computer numerical control. In the patented apparatus, a knockout shaft is first introduced into a container body through the open end and the end of the container is then forced into a convergent forming die by a pusher rod pushing on the opposite (closed) end of the container body. A gas under pressure is also introduced into the container through the knockout shaft (to stiffen the container body), and the knockout shaft is then withdrawn as the open end of the container body is shaped by the die. This same kind of operation may be carried out in the embodiment of FIGS. 1 and 2 of the present application, except that eight container bodies are subjected simultaneously to one die necking operation at the top of the star wheel, and another eight container bodies are subjected simultaneously to a second die necking operation at the bottom of the wheel, and both die necking operations are carried out at the same time, but the operations may be (and generally are) different necking operations (as explained later).

Specifically, as rotation of the star wheel stops, the knockout shaft frame elements 118 and the equivalent element at the bottom of the wheel are moved towards the star wheel through the tubular necker dies 115 in readiness to enter aligned container bodies. The container bodies 105 are then pushed into the open ends of the necker dies 115 by the movement of pusher rods 110 driven by the movement of the frame elements 111 and 111' towards the star wheel. As the open ends of the container bodies enter the necker dies, the knockout shafts enter the container bodies and deliver gas under pressure, and are then withdrawn from the containers by movement of the knockout shaft frame elements 118 away from the star wheel as the shaping of the necking of the container bodies is completed. After the necking operation, the container bodies are returned to their starting positions in the holders 104 by combined action of the knockout shafts (moving again towards the star wheel) and/or by the gas pressure within the container bodies. The container bodies are consequently disengaged from the tool sets at this point and the star wheel is free to make another rotation of one third of a complete turn, thereby bringing additional container bodies into register with the tool sets.

The tool sets (necker dies, knockout shafts and pusher rods) within each group of workstations are preferably identical to each other, but the tool sets of the two groups differ from each other or are operated differently. For example, the necker dies 115 at the bottom of the star wheel may have narrower die openings than those at the top so that a container is progressively necked inwardly to form an ever-narrower opening as the container body advances around the star wheel, or alternatively, the pusher rods at the bottom may have a longer "throw" to push the container bodies deeper into the necker dies than those of the top group, thereby achieving a greater degree of necking. It will be appreciated that, in the illustrated embodiment, each container body undergoes just two die necking operations as it follows the path around the star wheel, one at a workstation at the top of the wheel and one at a workstation at the bottom of the wheel. However, sixteen container bodies (the two groups of eight) are necked simultaneously at each pause of the wheel. The throughput of the apparatus is therefore much higher than when containers are necked individually (e.g. in the apparatus of the Geho et al. patent mentioned above).

It will also be appreciated that the provision of eight tool sets in each group is not essential and there may be more or fewer. For example, if three necking operations are required for each container body, there may be three groups of tool sets arranged around the star wheel, each group having six tool sets. Each turn of the star wheel would then advance the container bodies in groups of six.

Preferably, the tool sets of each group should all be the same and should be operated in the same way to produce identical necking operations on the container bodies. Tool sets of different groups would then be different from each other or operated in different ways. However, this is not essential in all cases. For example, each tool set of a group could be different from the other so that adjacent container bodies aligned with the group are formed in different ways. The next set of tool sets positioned around the star wheel could then also have different tool sets (or operations) in each position. The end result at the completion of each part rotation would be the removal from the star wheel of eight container bodies formed (necked) in different ways from each other (i.e. eight different products) which would then be separated from each other further down the production line. Clearly, a further alternative would be to have some tool sets of one group the same and others different, as required for particular product lines.

Normally, the star wheel is advanced by a number of holders corresponding to the number of tool sets in each group, but again this is not essential, particularly if the tool sets of the same group differ from each other. Generally, however, the star wheel is advanced by at least two holders at each rotational step, although there are circumstances in which it may be desirable to advance the holders one at a time, and to provide a plurality of individual tool sets that carry out two or more different forming operations on the container bodies, one at each step of advancement.

Figure 2:
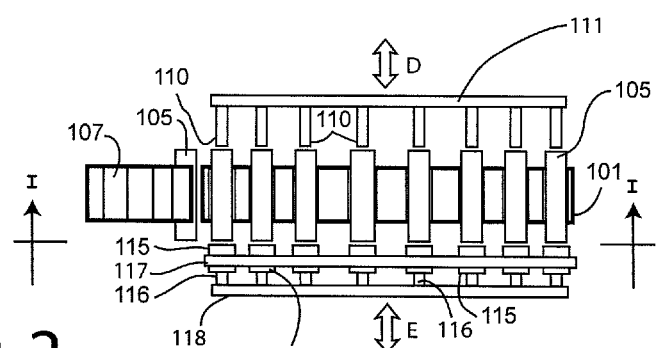
FIG. 2 is a top plan view of the apparatus of FIG. 1 showing, in addition to the features of FIG. 1, some of the apparatus not visible in that view.
Figure 3:
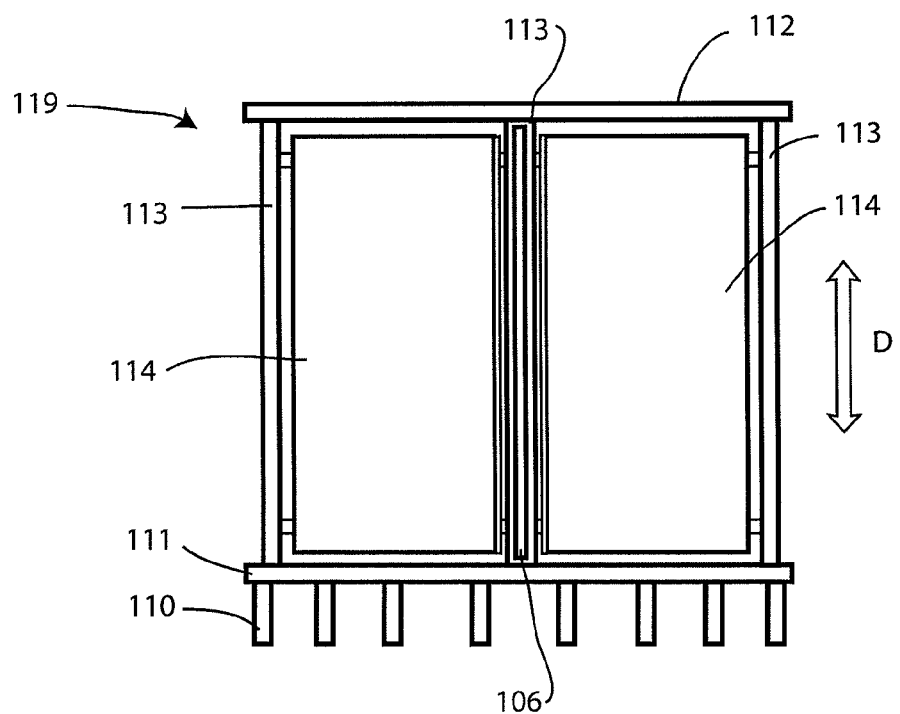
FIG. 3 is a top plan view of a movable carriage for elements shown in FIGS. 1 and 2.
Figure 4:
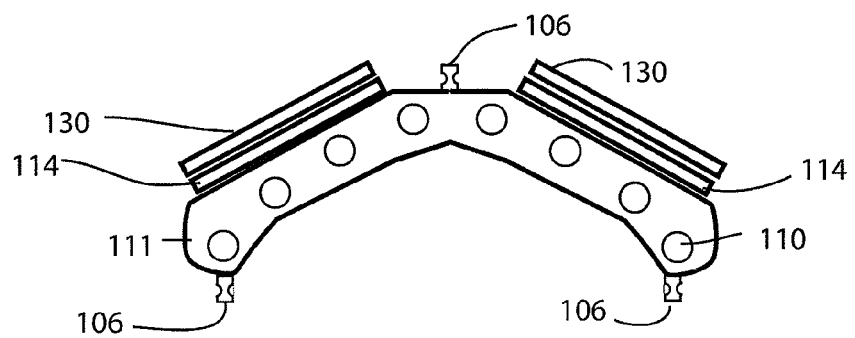
FIG. 4 is a front elevation of the carriage of FIG. 3.

Referring again to the embodiment of FIGS. 1 and 2, the pusher rod frame elements and knockout shaft frame elements 111, 111' and 118, etc., may be moved back and forth in the directions of arrows D and E by any suitable drive means, such as hydraulic or pneumatic piston and cylinder combinations, preferably under computer numerical control. However, more preferably, the drive means consist of linear electric motors because such motors are compact, quick acting, forceful and easily controllable. An example of the use of linear electric motors is illustrated in FIGS. 3 and 4 of the accompanying drawings, FIG. 3 being a top plan view similar to that of FIG. 2, but showing only one pusher rod frame element 111, the accompanying pusher rods 110, and associated parts. FIG. 4 is a vertical elevation of the frame element of FIG. 3 viewed from the front (i.e. the side supporting the pusher rods 110). The pusher rod frame element 111 forms part of a carriage 119 in which the pusher rod frame element is aligned with a similar element 112 and rigidly attached thereto by connecting rods 113. As best seen from FIG. 4, the carriage 119 supports a pair of flat metal plates 114 at its upper sloping sides, the plates being attached to the carriage 119 by suitable connectors. The carriage has longitudinal rails 106 provided with lateral grooves which support the carriage in elongated sliding bearings (not shown) fixed to the supporting frame of the apparatus. The sliding bearings incorporate ball bearings that engage the lateral grooves of the rails, thus making the carriage slidable back and forth relative to the remainder of the apparatus as shown by arrow D. Attached to the supporting frame of the apparatus (not shown)

are a pair of flat stationary linear drive elements 130 facing the flat metal plates 114. Together, the plates 114 and the elements 130 form linear electric motors, and current passing through the drive elements drives the plates (and hence the carriage 119) in one direction or the other along rails 106 according to the polarity of the current. The application of the current or voltage is kept under computer numerical control, so that the movement of the framework can be made to follow a pre-determined pattern of movement suitable for the intended necking operations. Each of the other pusher rod or knockout shaft frame elements 111', 118, etc., are also supported in the same way and each is provided with its own equivalent linear electric drive motors controlled by computer.

Figure 6:
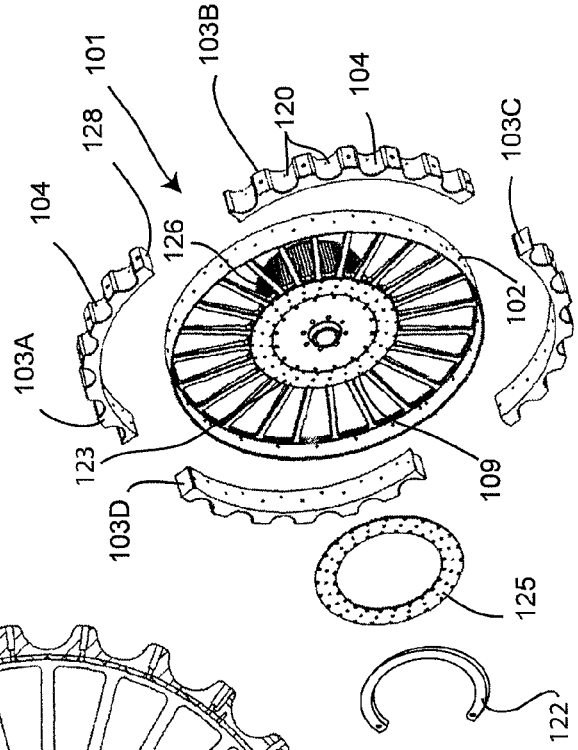
FIG. 6 is an exploded view of the star wheel shown in FIG. 5.
Figure 5:
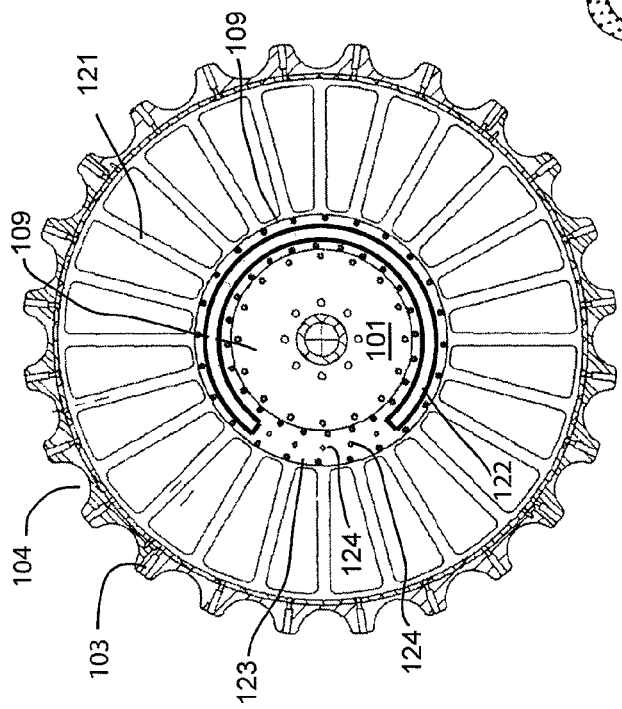
FIG. 5 is a vertical cross-section through a star wheel forming part of the apparatus of FIGS. 1 and 2.

FIGS. 5 and 6 show the star wheel 101 of FIGS. 1 and 2 in vertical cross-section (FIG. 3) and in exploded form (FIG. 4). Each of the container body holders 104 is provided with at least one bore 120 connected via hollow spokes 121 to a central hub 109. A sidewall 123 of the hub is provided with a series of holes 124 which connect through the hub 109 to individual hollow spokes 121. A wear plate 125 is fixed over the sidewall and rotates with it, and this too has holes that register with those in the sidewall. The purpose of the wear plate 125 is to protect the star wheel (usually made of relatively soft aluminum) from excessive wear caused by contact with a vacuum manifold 122. For this reason, the wear plate is made of a more wear-resistant metal, e.g. steel. In use, the vacuum manifold 122 remains stationary and the wear plate 125 and sidewall 123 rotate with the star wheel 101. The vacuum manifold (which has an internal channel open to the wear plate 125) is connected to a vacuum pump (not shown) and is dimensioned to cover part of the wear plate, so that air may be withdrawn through the bores 120 of holders 104 when in particular positions around the periphery of the star wheel 101. When a container body 105 is positioned in a holder 104 located in such a position, the withdrawal of air in this way generates a vacuum that holds the container body firmly within the holder. When the vacuum is broken as the holder moves to a position where it is not connected to the vacuum pump via the vacuum manifold 122, the container body may be removed from the holder without difficulty, e.g. by transfer to a similar holder in removal transfer wheel 108. The holder in the removal transfer wheel 108 would then be subjected to vacuum in a similar way (via the transfer wheel's own similar suction arrangement), thus making the transfer operation slippage-free. The same arrangement is provided for the feeder transfer wheel 107, so the container bodies may be moved easily between holders of the transfer wheels and star wheel as required, without vacuum being applied to idle holders (those not provided with container bodies). Thus, the vacuum manifold 122 employed for star wheel 101, and those used for the transfer wheels and additional star wheels of later embodiments, are dimensioned to provide suction only where it is required. This may mean that the manifold is almost a full circle in some embodiments or only half a circle or less in other embodiments. Indeed, for some of the additional embodiments described below, there may be two manifolds per star wheel (e.g. if only the holders at the top of the wheel and those at the bottom of the wheel require vacuum, but those at the sides do not—see the first star wheel of the embodiment of FIG. 7, for example).

The holders 104 are formed in a peripheral ring 103 attached to the rim 102. From the exploded view of FIG. 4, it can be seen that the ring 103 that is divided into four parts 103A, 103B, 103C and 103D attached to the star wheel by suitable means, such as screws or bolts (not shown). This arrangement makes it easy to change one peripheral ring for another having holders of different kinds if container bodies of different size or shape are to be processed by the apparatus. Of course, if desired, the peripheral ring may be made in a single piece that is simply slipped over the rim 102 of the star wheel from one side and then secured by screws or the like. Also just visible in FIG. 4 is a torque motor 126 at the hub that provides precision rotational movements of the star wheel during each step of its rotation. If desired, the motor may be operated under computer numerical control to achieve high precision in the desired movements for each individual set-up of the apparatus, and also to allow the movements to be programmable. If desired, the hub may also incorporate a braking mechanism (not shown) to ensure that the star wheel stops precisely in the desired angular position at the end of each step of advancement.

Figure 7:
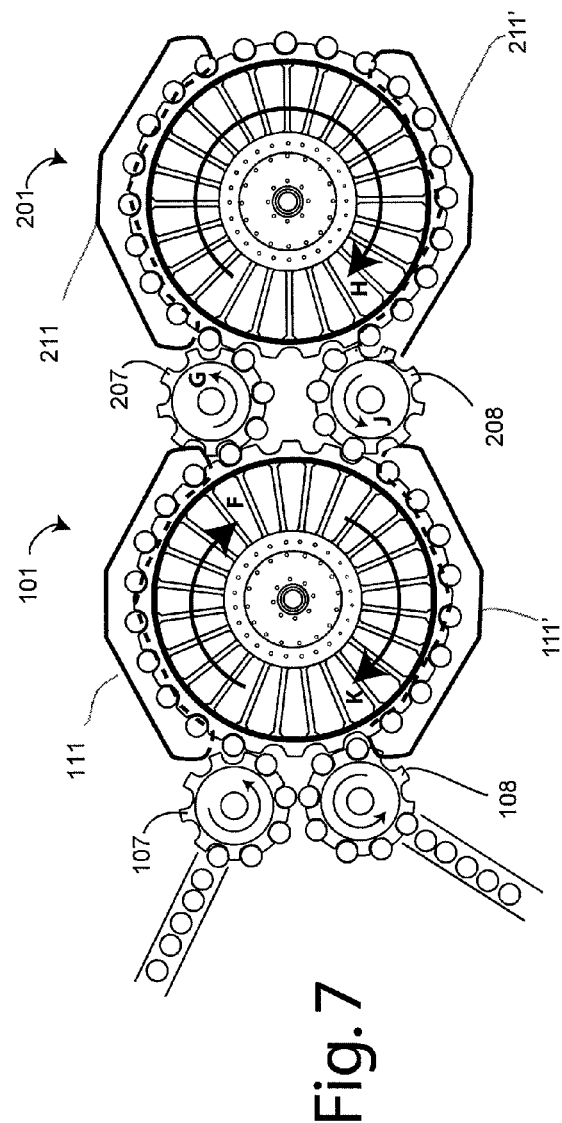
FIGS. 7 and 8 are views similar to FIGS. 1 and 2, respectively, of another exemplary embodiment.
Figure 8:
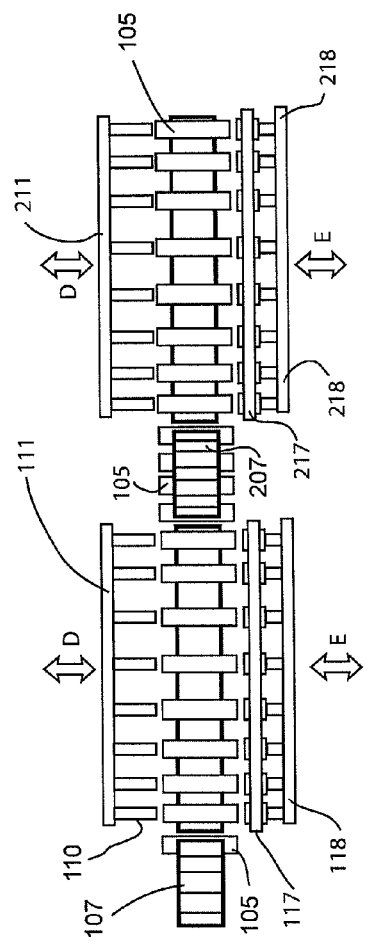

It is possible to increase the capacity of the apparatus (i.e. the number of container bodies included in each group, or alternatively, the operations that may be carried out without changing the number of container bodies treated as a group) in a number of ways. One way is to increase the diameter of the star wheel 101 so that it can hold more container bodies of a given size around its periphery, but this may increase the dimensions of the apparatus unacceptably (particularly the height) and may introduce other problems, such as the required capacity of the rotational motor, etc. An alternative way of increasing the capacity of the apparatus is shown in FIGS. 7 and 8 of the accompanying drawings. This embodiment chains two star wheels 101 and 201 together with transfer wheels 207, 208 positioned between them to transfer the container bodies from one star wheel to the other. Each star wheel 101, 201 is provided with two pusher rod frame elements 111, 111' and 211, 211', as well as knockout shaft frame elements 118 and 218 (and equivalent frame elements (not shown) at the bottom of the wheels) aligned with each other on the opposite side of the wheels (see FIG. 8). The two star wheels are moved in unison in a stepwise manner so that each wheel is advanced by eight holder positions per rotational step (one third of a complete turn). While the holders 104 on each star wheel are constrained to follow a circular route or circuit at the wheel periphery, the container bodies 105 follow a looping serpentine path indicated by arrows F, G, H, J and K around parts of the peripheries of the star wheels and transfer wheels. In this way, an individual container body passing the pusher rod frame elements 111, 211, 211' and 111' (and the corresponding knockout shaft frame elements) will be subjected to four separate die necking (or other) operations by the time the container body exits the apparatus at removal transfer wheel 108. As will be appreciated, the tool sets of each group are preferably the same and act on eight container bodies per operation so the number of operations has been doubled, compared to the embodiment of FIGS. 1 and 2, without changing the number of container bodies acted on by each group of tool sets.

If desired, any number of star wheels may be chained together in this way (three, four or even more) so that, a full set of die necking operations may be carried out on a container body in its path through the apparatus, even if many individual die necking steps are required. A completed container body can therefore be produced by a single apparatus even in cases requiring many forming steps.

The transfer between successive star wheels is accomplished by means of transfer wheels as explained above. Sometimes, deformed or misaligned container bodies may fall from the transfer wheels during the transfer and have to be collected and disposed of. To facilitate this, a conveyer (not shown) may be provided beneath each point of transfer between the star wheels to remove such dropout container bodies automatically from the apparatus.

Figure 9:
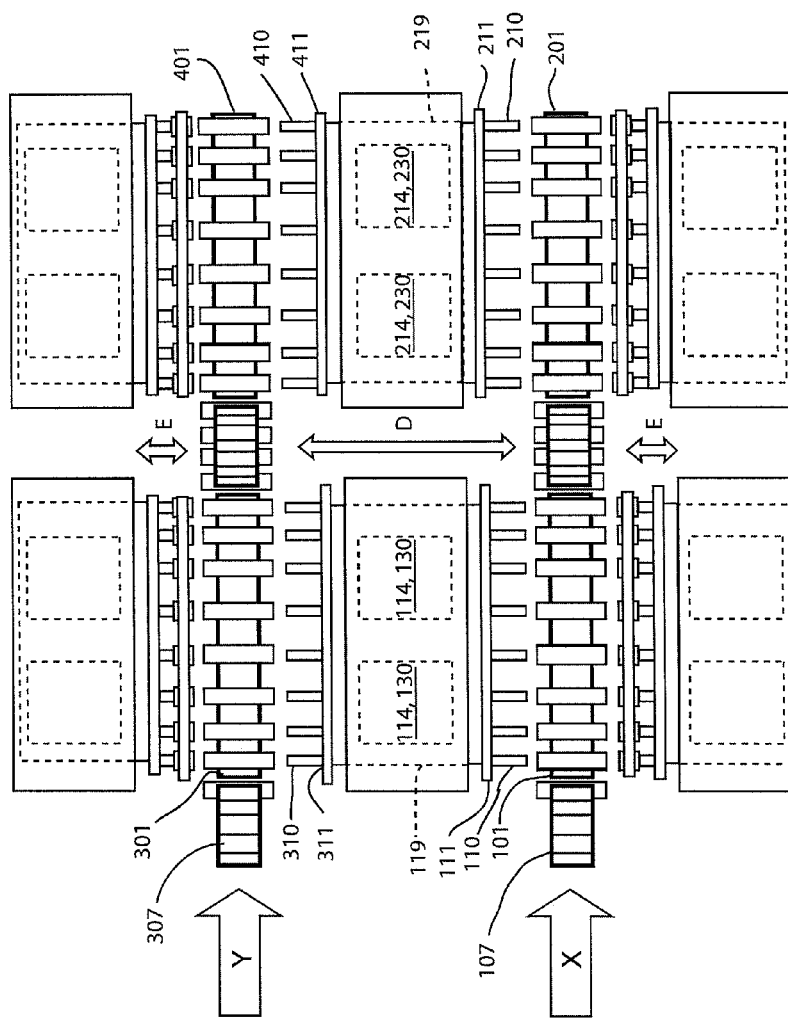
FIG. 9 is a top plan view of yet another exemplary embodiment.

The capacity of the apparatus of the invention may be increased still further in the manner shown in FIG. 9. In this embodiment, two chained star wheel arrangements of the kind shown in FIGS. 7 and 8 are effectively operated in tandem (side-by-side) while using some equipment in common. As shown, there are four star wheels 101, 201, 301 and 401, two of which (star wheels 101 and 201) are chained together and operate from one supply of container bodies (indicated by arrow X) introduced via feeder transfer wheel 107, and the other two of which (star wheels 301 and 401) are chained together and operate from a second supply of container bodies (indicated by arrow Y) fed to the apparatus via feeder transfer wheel 307. The designations X and Y are used henceforth to indicate different container body treatment lines in the common apparatus. This arrangement effectively provides two treatment lines operated side-by-side sharing common pusher rod carriages 119 and 219 incorporating pairs of linear motors each made up of plates 114, 214 and liner drive elements 130, 230 that move the pusher rod frame carriages one way or the other as shown by arrow D. The linear motors may thus be operated to extend pusher rod frame elements 111, 211, 311 and 411, and the attached pusher rods 110, 210, 310 and 410, one way or the other, thus acting on the container bodies 105 alternately on one line of the two tandem lines X, Y, and then on the other. The apparatus otherwise works in the same way as the previous embodiments. The star wheels of one line may be rotated in step with the star wheels in the other line (in phase rotation), in which case the pause between rotational steps must be long enough to allow die necking of the container bodies on one line and then, as a separate operation, die necking of the container bodies on the other line, or they may be rotated out of step (out of phase rotation), in which case the container bodies on one line may be die necked while the rotation of the star wheels of the other line brings the container bodies of the other line into register with the work stations ready for die necking. The latter arrangement is more time efficient and is generally preferred. The motors used for rotating the star wheels of the two different lines are not slaved together, but the timing of the two lines may be kept in register by means of precise computer control. Clearly, the pauses between rotational movements should be kept as short as possible (just long enough for the forming operations to be carried out) in order to increase the rate of container body throughput.

Figure 10:
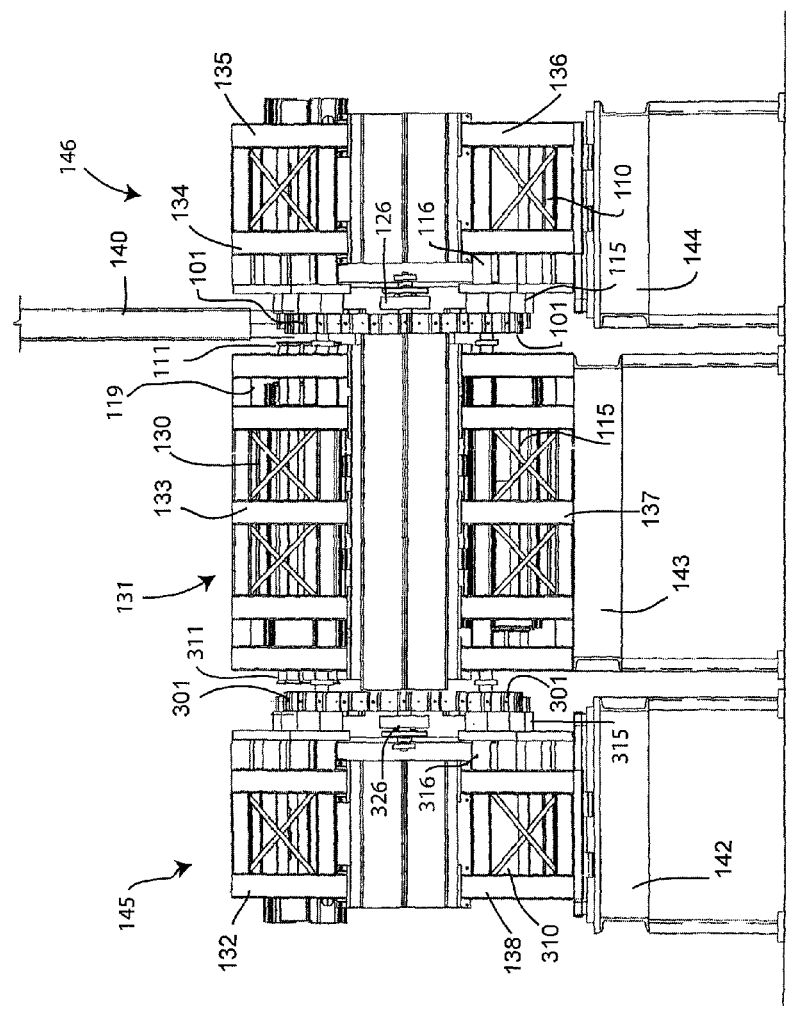
FIGS. 10, 11 and 12 are, respectively, an end view, a side view and a top plan view of an embodiment similar to that of FIG. 9, showing more detail but with some parts omitted for clarity.
Figure 11:
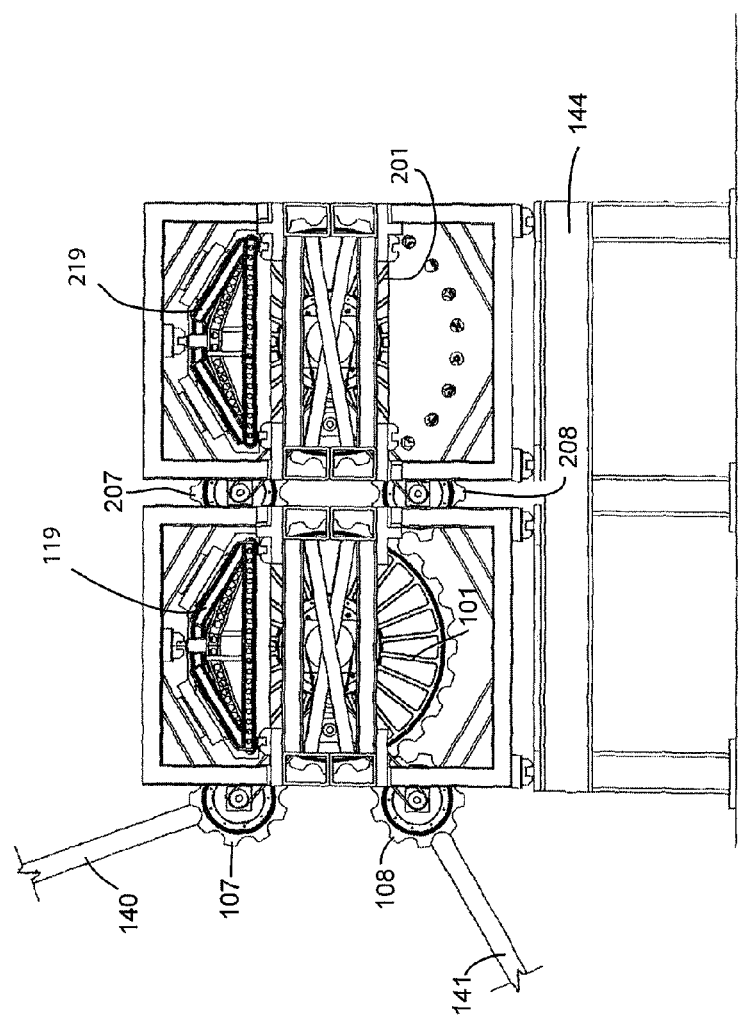
Figure 12:
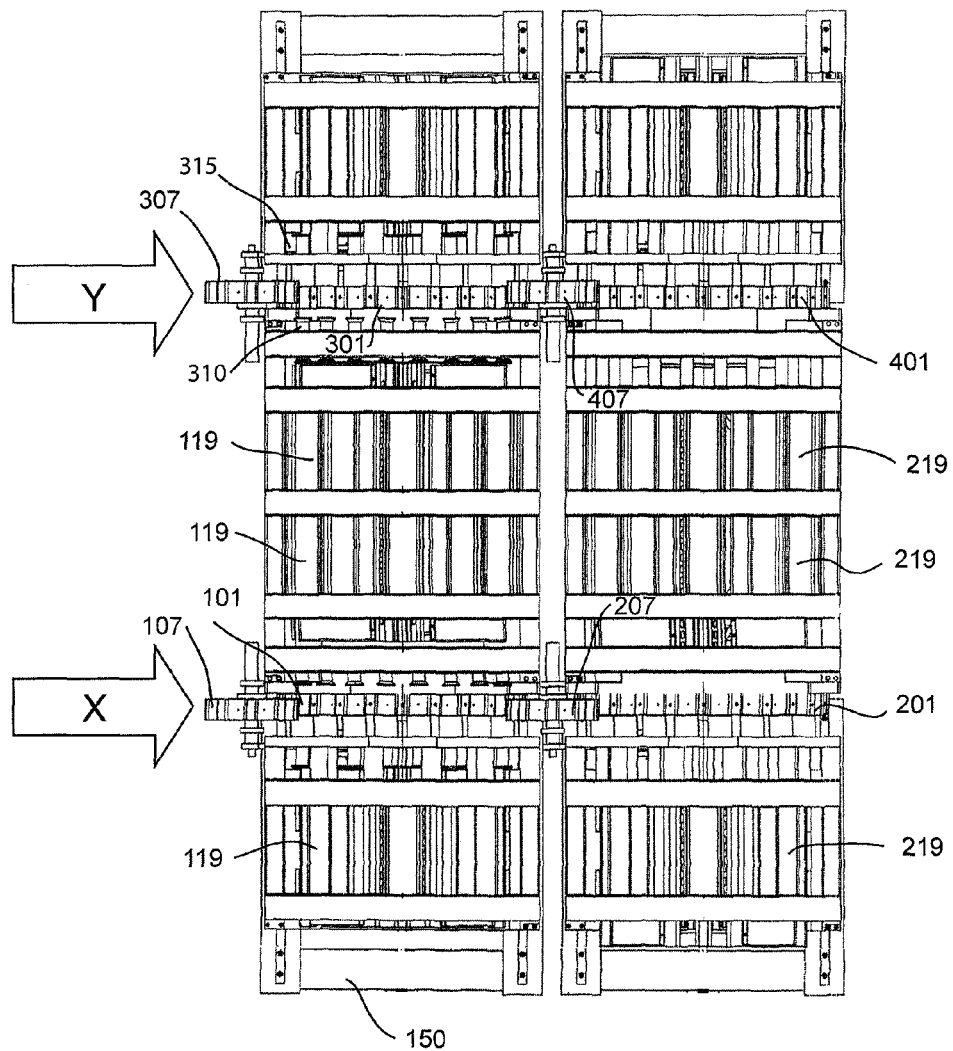

A practical form of the embodiment of FIG. 9 is shown in FIGS. 10, 11 and 12. In the end view of FIG. 10 (a view equivalent to a view from left to right in FIG. 9), the first star wheels 101 and 301 of the two lines can be seen. A central apparatus unit 131 contains the linear drive elements 130 capable of operating the carriage 119 and pusher rods 111, 311 of both lines in sequence, and two end apparatus units 145 and 146 contain dies and knockout shafts 115, 315 and 116, 316 of the two lines as well as their associated linear drive motors. Rotary torque motors 126 and 326 for star wheels 101 and 301 are located in the each end of central unit 131. The various pieces of the apparatus are carried on supports 142, 143 and 144 and are held firmly in place by a metal framework of pieces such as elements 132 to 138. One of the delivery chutes 140 is shown in the drawing, but the other delivery chute and removal chutes are omitted for clarity.

The side view of FIG. 11 shows the two star wheels 101, 201 of one of the lines, as well as feeder transfer wheel 107, upper transfer wheel 207, lower transfer wheel 208, and removal transfer wheel 108. Only the upper carriages 119, 219 are shown in this view for simplicity.

The top plan view of FIG. 12 shows the two lines X and Y feeding feeder transfer wheels 107 and 307. Star wheels 101, 201, 301 and 401 are visible, as are upper transfer wheels 207 and 407. Pusher rods can be seen at 310 and necker dies at 315. The various elements are held within a framework 150 of metal members.

Figure 13:
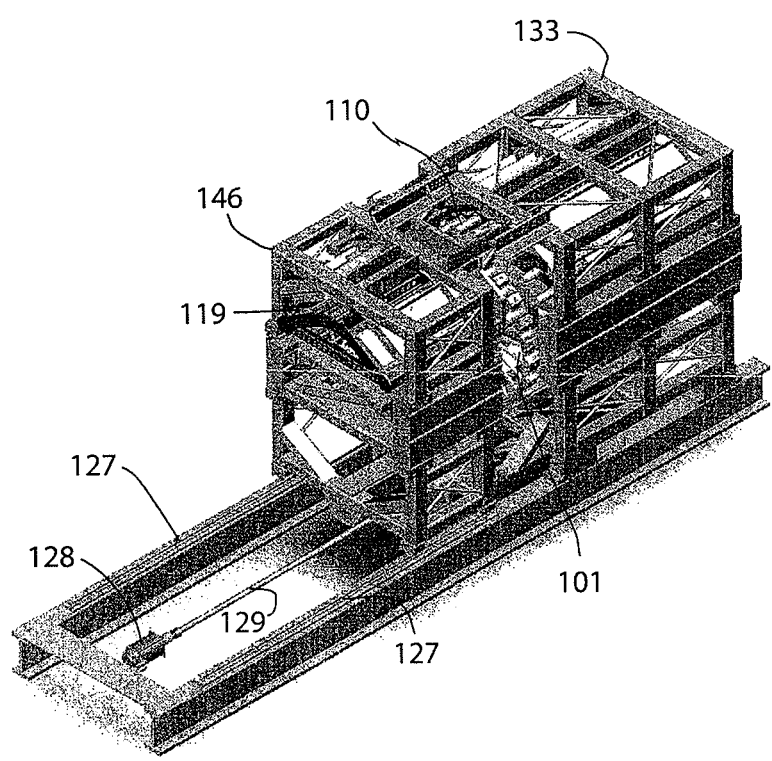

FIG. 13 is a perspective view of a single star wheel apparatus having an end apparatus unit 146 that contains the necker dies, the knockout shafts and their carriage 119, and the linear drives for the carriage. Another apparatus unit 133 supports the pusher rods 110 and their respective carriage and linear drives. The unit 146 is slidable towards and away from the star wheel 101 along track members 127 by a rod 129 having a screw thread driven by an electric motor 128 to allow more room for servicing and repair. During normal operation, the unit 146 is clamped in position on the track members by clamping elements (not shown) to fix the unit rigidly in the operating position, which is clearly necessary for the necking operations to proceed. Of course, unit 133 could be made slidable in this way instead of unit 146, or they could both be made slidable by providing suitable track elements and drives.

In addition to making the apparatus easier to maintain, the above apparatus may also be used to adjust the "pin height" (i.e. the closed or operational position) of the apparatus unit 46 (which affects the proximity of the tool set (e.g. necker die and knockout shaft) to the star wheel). By using precision electrical and mechanical components for moving and fixing the apparatus unit, the position of the unit can be carefully and precisely adjusted. For this purpose, the motor 128 may form part of a servo control drive system, e.g. using encoders and continuous feedback, and the unit may ride on precision bearings along track 127. Precise means of fixing the unit in position (clamps) are also provided. This allows changes to be made without physically altering the apparatus or its base, and there is no need to drill new mounting holes nor to unbolt and re-bolt the various components. This system allows the apparatus to be used with container bodies of different heights without costly down-time or parts replacement.

The invention claimed is:

1. A star wheel system configured to be used with an apparatus for forming open ends of open-ended metal container bodies, said star wheel system comprising:
    a hub configured to rotate about a central axis;
    a rim spaced about said hub;
    a first plurality of container body holders spaced evenly around said rim said first plurality of holders each including a vacuum hole configured to deliver a vacuum pressure to hold the metal container bodies in said first plurality of holders;
    wherein said first plurality of holders are detachable from said star wheel and replaceable by a second plurality holders, the first plurality of holders being configured to hold metal container bodies having a first size and the second plurality of holders being configured to hold metal container bodies of a second size, the first size being different from the second size, whereby the star wheel system is configured to process metal container bodies having the first size and the second size.

2. The star wheel system of claim 1, wherein said first plurality of holders are depressions formed in a peripheral ring attached to said rim, and said ring is detachable from said rim and replaceable by a different ring having said second plurality of holders formed therein.

3. The star wheel system of claim 1, wherein said first plurality of holders consist of the same number of said other holders as said second plurality of holders.

4. The star wheel system of claim 1, wherein said first plurality of holders consist of a different number of holders as said second plurality of holders.

5. A star wheel system configured to be used with an apparatus for forming open ends of open-ended metal container bodies, said star wheel system comprising:
- a hub configured to rotate about a central axis;
- a rim spaced about said hub;
- a first plurality of container body holders spaced evenly around said rim said first plurality of holders each including a magnet configured to deliver a magnetic force to hold the metal container bodies in said first plurality of holders;
- wherein said first plurality of holders are detachable from said star wheel and replaceable by a second plurality holders, the first plurality of holders being configured to hold metal container bodies having a first size and the second plurality of holders being configured to hold metal container bodies of a second size, the first size being different from the second size, whereby the star wheel system is configured to process metal container bodies having the first size and the second size.

6. The star wheel system of claim 5, wherein said first plurality of holders are depressions formed in a peripheral ring attached to said rim, and said ring is detachable from said rim and replaceable by a different ring having said second plurality of holders formed therein.

7. The star wheel system of claim 5, wherein said first plurality of holders consist of the same number of holders as said second plurality of holders.

8. The star wheel system of claim 5, wherein said first plurality of holders consist of a different number of holders as said second plurality of holders.

* * * * *